March 11, 1958 C. E. GRIMES 2,826,065
APPARATUS FOR TESTING AND MEASURING RESISTANCE
OF DRIVEN EARTH ANCHORS
AGAINST DISPLACEMENT
Original Filed May 20, 1952 3 Sheets-Sheet 2
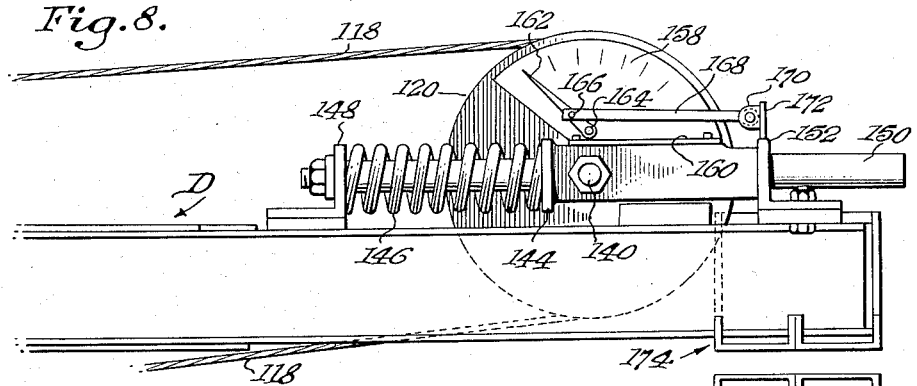
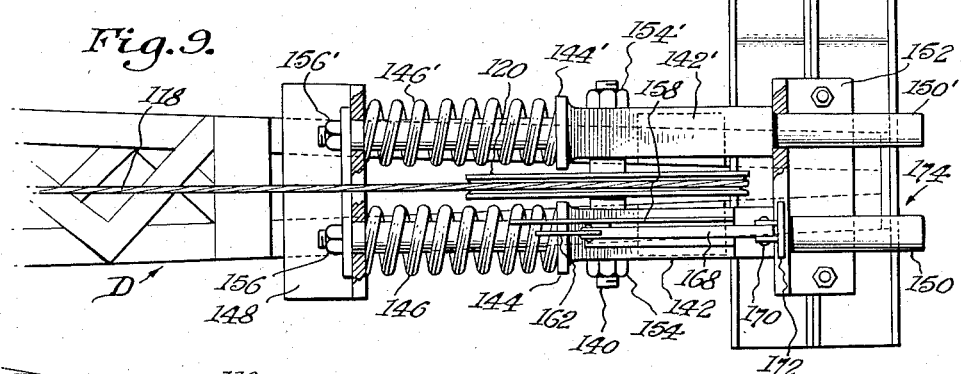
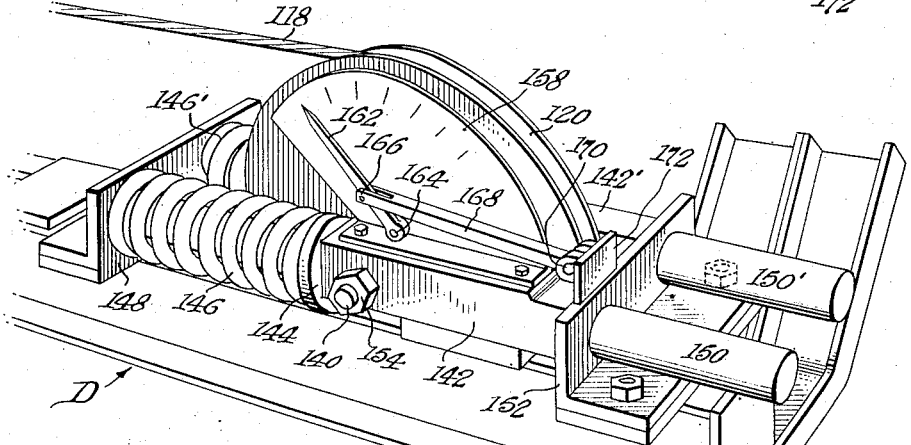
INVENTOR.
CLAUDE E. GRIMES
BY

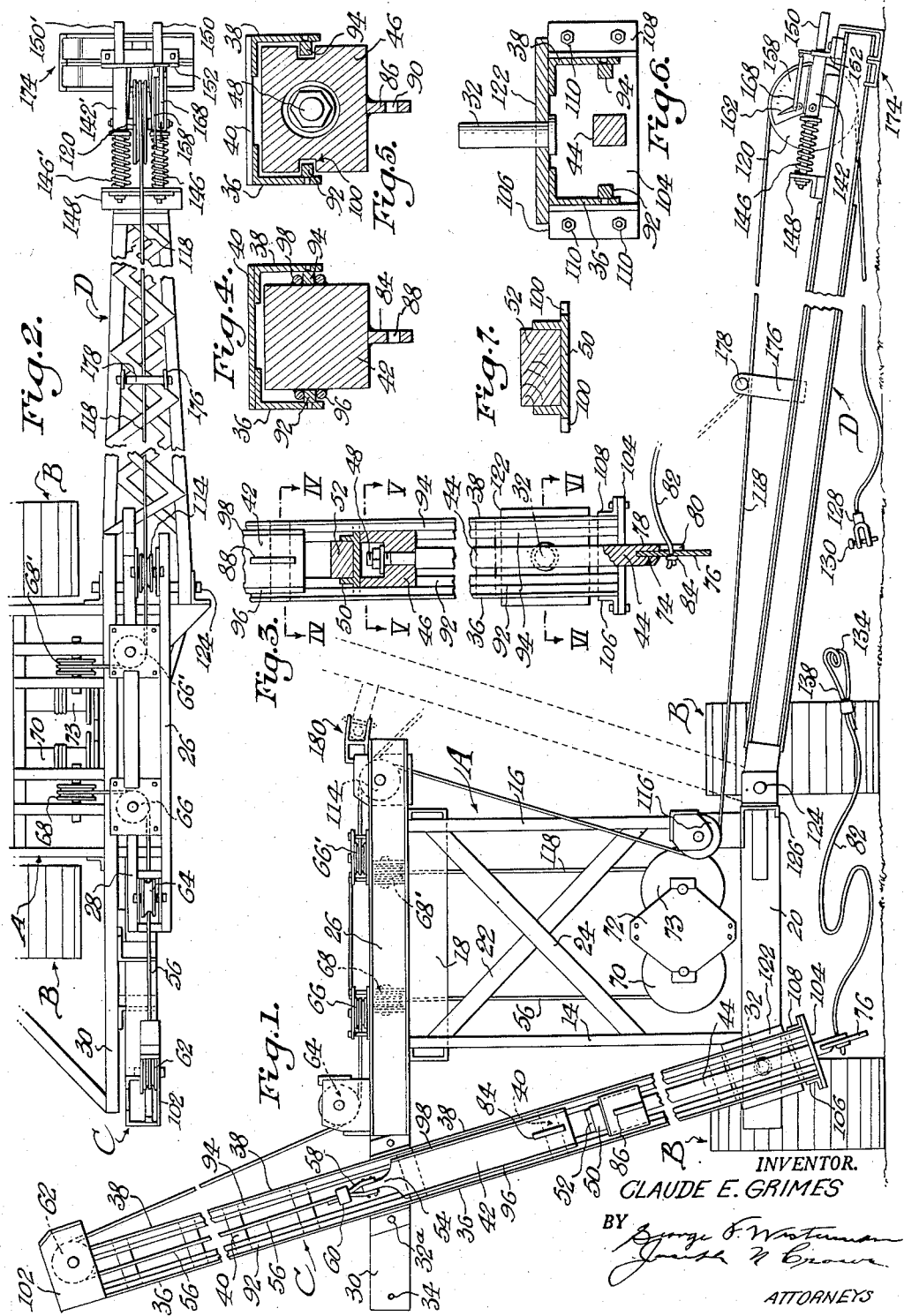

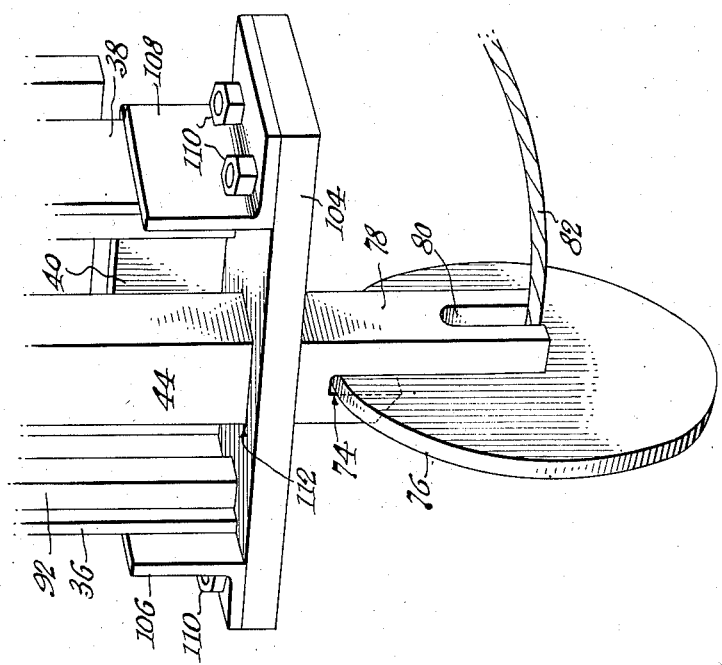
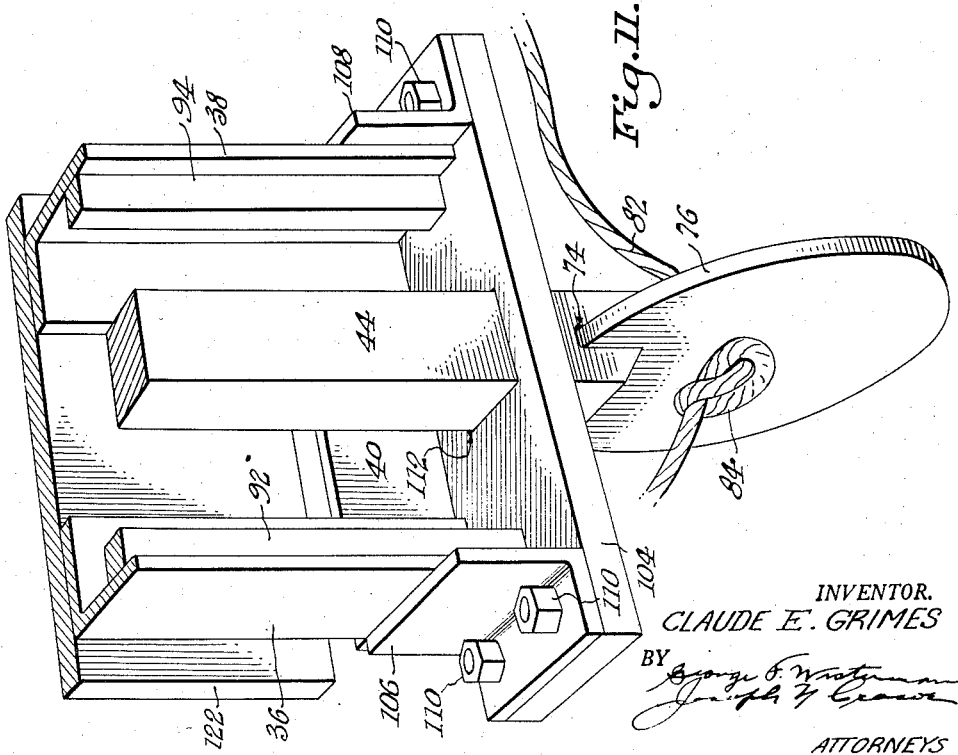

United States Patent Office 2,826,065
Patented Mar. 11, 1958

2,826,065

APPARATUS FOR TESTING AND MEASURING RESISTANCE OF DRIVEN EARTH ANCHORS AGAINST DISPLACEMENT

Claude E. Grimes, Vicksburg, Miss.

Original application May 20, 1952, Serial No. 288,988, now Patent No. 2,780,068, dated February 5, 1957. Divided and this application August 9, 1956, Serial No. 603,199

1 Claim. (Cl. 73—141)

(Granted under Title 35, U. S. Code (1952), sec. 266)

The invention described herein may be manufactured and used by or for the Government for governmental purposes without the payment of any royalty thereon.

The present application is a division of the copending application, Serial No. 288,988, filed May 20, 1952, entitled "Driving Apparatus for Earth Anchors," now issued as Patent No. 2,780,068.

The present invention relates to equipment for the placement of earth anchors and for determining the amount of load which such anchors can withstand without displacement after having been driven into the earth. More particularly, the present invention provides improved mechanical earth anchor driving equipment combined with prestressing mechanism for use in driving earth anchors (or "deadmen") in place for holding articulated concrete revetment mattresses in place on the bank of a river for inhibiting erosion of such bank, and for any other purpose when an earth anchor is to be employed and where an anchor driver and prestressing device can be used.

The present invention has for one of its objects the provision of combined driving and testing instrumentalities for placing earth anchors in any material penetrable by sheet piling in combination with the testing mechanism for the anchors after placement thereof, which mechanism permits positive determination of capacities for suspension of free load by prestressing the placed anchors before a load is attached thereto.

A further object of the invention is to provide equipment of the indicated character in combination with unitary mounting means therefor for enabling the mounting of the equipment on a suitable transportation vehicle having sufficient power for transporting such equipment and for actuating requisite accessory parts of the equipment that are positioned on the mounting means.

A still further object of the invention is to provide such equipment which permits the use of low cost anchors and provides expeditious placement thereof with the minimum of labor, and which obviates the need for backfilling and tamping of earth and other material over the anchors after placement of the anchors.

Other objects and advantages of the invention will become apparent as the description proceeds, and the features of novelty will be pointed out in particularity in the appended claim.

The improved construction of the present invention will be understood more readily by reference to the accompanying drawings, in which:

Fig. 1 is a front elevation of a rig embodying the improvements of the present invention, mounted upon the front end of a traction vehicle;

Fig. 2 is a plan view of Fig. 1;

Fig. 3 is a fragmentary elevation, partly in section, of the lower portion of the anchor-driving mechanism;

Fig. 4 is a horizontal sectional view taken on the line IV—IV of Fig. 3 looking in the direction of the arrows;

Fig. 5 is a horizontal sectional view taken on the line V—V of Fig. 3 looking in the direction of the arrows;

Fig. 6 is a horizontal sectional view taken on the line VI—VI of Fig. 3 looking in the direction of the arrows;

Fig. 7 is an enlarged detailed sectional view showing the mounting of a cushion member employed for receiving impacts of an anchor-driving hammer;

Fig. 8 is a fragmentary side elevation of the free end of the prestressing boom and associated parts employed for determining the resistance of the placed anchors against displacement under a free load;

Fig. 9 is a plan view of the parts shown in Fig. 8;

Fig. 10 is a perspective view of the structure shown in Fig. 8;

Fig. 11 is a perspective view of the lower end of the anchor-driving boom and associated parts, showing an earth anchor or "deadman" in position to be driven into the earth; and Fig. 12 is a perspective view similar to Fig. 11 but viewed from the opposite side of Fig. 11.

Referring more particularly to the drawings, the illustrated embodiment of the improved construction comprises essentially a rig A adapted to be mounted on the front end of a conventional tractor vehicle, the treads of which are indicated at B. The rig A carries a driving boom C and a testing boom D, which will be described in greater detail hereinafter.

The rig A is composed of a suitable frame having vertical side beams 14 and 16 connected by top and bottom transverse beams 18 and 20, respectively, the side beams 14 and 16 being braced by diagonal beams 22 and 24. The rig frame is surmounted by horizontal spaced oppositely directed channels 26, 28, that project beyond the side beams 14 and 16. A supporting beam 30 for the driving boom C is mounted on the rig A. This driving boom C is pivotally mounted on the bottom transverse beam 20 as indicated at 32, the said supporting beam 30 being provided with a plurality of holes 34 for receiving removable bolts for securing the boom C in desired selected angles for the proper placement of an earth anchor or "deadman" operatively carried by the boom C.

This boom C comprises oppositely disposed angle guide members 36, 38, that are maintained in spaced relation by spaced straps 40, the angle members retaining between them a heavy driving hammer 42 that delivers driving impacts against a driving plunger 44 that is bolted into an apertured driving head 46 as is indicated at 48, the head 46 being mounted between the side angles 36, 38 and is guided thereby during the driving operation. This driving head 46 is surmounted by a recessed closure 50 which receives and retains a wooden cushion block 52 which receives directly the impacts of the hammer 42 and serves as a cushion therefor. The hammer 42 has a restricted upper end 54 having an eye opening therethrough for the reception of an end of the lifting cable 56 which is looped through this opening as shown at 58 and secured by fastening means 60.

The lifting cable 56 passes around a pulley sheave 62 mounted in the upper end of the broom C, thence around guide pulley sheaves 64, 66 and 68 disposed at right angles to each other and carried by the top structure of the rig A, thence around a bottom drum 70 mounted in a bearing plate 72 upon which drum 70 the cable 56 is wound. The drum 70 is operated by the source of power for the tractor, which is designed alternately to pull on the cable 56 for lifting the hammer 42 and to release the cable for allowing the hammer 42 to drop by gravity until it impacts against the cushion block 52 for driving the plunger 44 downwardly by successive strokes. Since the cushion block 52 directly receives the driving impacts of the hammer 42, the driving head 46 is protected against damage from the hammer.

The lower end of the driving plunger 44 is slotted as is indicated at 74 for the reception of an earth anchor 76, one side 78 of the lower end of the driving plunger 44 being extended substantially longer than the opposite side of the slot 74 for reinforcingly supporting the anchor 76 during the driving operations. The lower end of the prolonged side 78 of the driving plunger is recessed, as indicated at 80, for receiving a flexible stay cable 82 that passes through a central opening provided therefor in the anchor 76, the cable 82 being securely restrained against accidental displacement from the anchor 76 by a knot 84 or other suitable locking means, formed adjacent to the inserted end of the cable 82. As will be seen from the drawings, the anchor 76 preferably is in the form of a disc that is inserted edgeways into the slot 74 in the bottom end of the driving plunger 44, so that the anchor 76 will be driven edgeways into the earth at an angle determined by the selected slope of the driving boom C. When driven into the earth for the desired distance, displacement of the anchor disc 76 is resisted by the dimensions of the flat surfaces thereof, the stay cable 82 exerting a pull on the anchor at least approximately perpendicularly to the flat faces of the anchor disc.

It will be understood that the anchor disc 76 is loosely retained in the slot 74, and as the anchor disc is driven into the ground the stay cable 82 cuts into the ground along with the disc and is forced inwardly relative to the end slot or recess 80 in the prolonged side 78 of the driving plunger 44, thus maintaining the anchor disc 76 centered relative to the driving plunger during placement of the disc. It will be noted also that the driving plunger 44 and the hammer 42 are provided with aligned lugs 84 and 86, respectively, which lugs are provided with eye openings 88 and 90 which may be interconnected by a coupling hook, or the like (not shown), which enables the driving bar to be withdrawn from the anchor disc 76 after the latter has been driven into place in the ground, so that as the cable 56 is pulled by the source of power of the tractor, the hammer 42 and the driving plunger 44 will be raised together, the driven anchor disc 76 being released responsively to the lifting of the hammer and driving plunger. In order to guide and to maintain the hammer 42 and driving plunger 44 properly with respect to the side angles 36 and 38 of the boom C, these side angles are provided with inwardly projecting guide slides 92 and 94, the hammer 42 having lugs 96 and 98 in sliding engagement with these guide slides, and the head 46 being oppositely recessed, as shown at 100, for reception of these guides 92 and 94.

The upper end of the boom assembly C is rigidified by plates 102 welded or otherwise secured to the side angles 36 and 38, the sheave 62 being mounted in these plates 102, the lower end of the boom assembly C being closed by a plate 104 spanning the bottom ends of the angles 36 and 38 and secured to the side angles 36 and 38 by angle brackets 106, 108, suitably held in place as by bolts 110, the plate 104 having a hole 112 therethrough for passage of the driving plunger 44.

When the anchor disc 76 has been driven into the ground to the desired depth, it is desirable to determine that it will withstand the requisite stresses which the load thereon will impart without causing displacement of the anchor disc. For this purpose, the rig A with pulley sheaves 66' and 68', corresponding to sheaves 66 and 68, and a winding drum 73 that is driven by the source of power for the tractor, this drum 73 corresponding to cable winding drum 70 and which is similarly mounted in bearing plate 72.

Another pulley sheave 114 is mounted on the outer end of the transverse channel member 26, 28 of the frame of the rig, a bottom sheave 116 being carried by the bottom frame bar 20 as shown. These sheaves guide an actuating cable 118 which passes around an end pulley 120 which is mounted on the outer end of the boom D that is pivoted at 124 to the bottom side channel 126 of the rig frame. This cable 118 is provided with a locking yoke 128 on its end and a locking pin 130 passes through this yoke. The yoke 128 and pin 130 are adapted to interlock with end loop 134 on the end of the anchor cable 82 that is secured to the anchor disc 76 at the center thereof. The loop 134 is secured by a cable clamp 138.

The pulley sheave 120 is turnably mounted on an axle 140 which extends through spaced parallel slides 142, 142' having abutment collars 144, 144' which bear against heavy coil springs 146, 146' mounted on the slides 142, 142', and bear against the aforesaid collars 144, 144' and a rear angle bracket 148 secured to the boom structure D. The slides 142, 142' are held forwardly in spaced parallel relation by cylindrical end portions 150, 150' which are mounted in end bracket angle 152 rigidly secured to the end of the boom structure D. The axle 140 for the pulley sheave 120 is secured in place by lock nuts 154, 154' and additional lock nuts 156, 156' which prevent accidental displacement of the slides 142, 142' from their mountings.

A dial scale 158 is mounted on the slides 142 through flange 160, an indicating pointer 162 being pivotally mounted on the dial scale 158 as is indicated at 164, this pointer 162 being also pivotally mounted at 166 in a bifurcated end of a link 168, this link being pivotally secured as shown at 170 to a plate 172 that is rigidly mounted on the upstanding side of the above-mentioned angle member 152 in which the ends 150, 150' of the slides 142 are mounted. The free end of the boom assembly D desirably is received in a skid element 174 for facilitating movement of the boom along normal terrain between anchor placements without requiring the boom to be raised.

From the foregoing description it will be seen that the anchor driver consists of a driving plunger 44 which is fastened to a drive head 46 mounted in guides 36, 38 under a drive hammer 42. This drive hammer may be the gravity type, as shown in the accompanying drawings, or a pneumatic, steam, or any type hammer suitable for driving sheet piling. When the gravity type hammer is used, both the hammer and the drive head are provided with the lugs 84 and 86 for the reception of coupling hooks for enabling withdrawal of the driving plunger after the anchor 76 has been driven into position. The driving guide 36, 38 is hinged to the lower framework of the rig A by a pivot bolt 32, which in practice is a two-inch pivot bolt, in order that the driving guide may be set at different driving angles as may be necessary, this pivot bolt 52 being carried by plate 122 mounted adjacent to the bottom end of the guides 36, 38. It is held in position by fastening it to the upper frame of the rig A with ¾-inch bolts 32ª passing through corresponding holes 34 in the upper framework of the rig.

The stress-measuring device comprises the fabricated boom D, at the end of which the spring-mounted sheave 120 is slidably secured. The levered indicator pointer 162 is attached by pivot pin 164 to indicator dial 158 on which the total anchor load is indicated. The boom D is hinged at 124 to the lower frame of the rig, directly in line with the pivot 32 of the driving guide. By removing the engagement of the stressing cable 118 from the lower right hand sheave 116 and with the end of the cable 118 suitably secured to the boom D at a suitable location, the boom D can be raised and fastened at 180 to the upper frame of the rig for long moves, or partially raised and held by cable drum brakes acting on the drum 73 for short moves over rough terrain. The boom is not raised between anchors on normal terrain but allowed to skid along the ground on skid 174.

The type of anochor employed is a steel plate having a usual thickness of ⅜-inch, through the center of which a hole is formed to take the anchor cable 82. The cable 82 is run through the hole and knotted as shown at 84, or fitted with a cable clip behind the anchor to hold the cable in the anchor. The anchor plate 76 can be circular, square, rectangular, or triangular as desired.

In operation, the rig, mounted on the tractor, is set up with the driver assembly over the point where the anchor is to be driven and with the driving guide set at an angle such that the anchor plate will be driven at approximately right angles to the direction of the stressing pull. The anchor plate 76 is placed manually in the anchor slot 74 with the cable running through the cable recess or slot 80. This keeps the anchor plate centered in the end of the driving plunger 44 while the drive is being made. Next, the anchor 76 is driven by striking the cushion block 52 with the drive hammer 42, the cable 82 following closely along the driving plunger 44. After the anchor plate 76 has been driven to the desired depth, the driving head 46 and the hammer 42 are connected together by hooks suitably inserted in the eye-lugs 86 and 84 and the driving plunger 44 withdrawn, leaving the anchor plate 76 in place. During the driving operation, sufficient slack is maintained between the hammer and the plunger 44 to cause a slight jar to be transmitted to the driving plunger which effectively frees the anchor plate 76 from small particles of earth that may be wedging it in the anchor slot.

After the anchor is in place and the driving plunger has been withdrawn, the anchor cable 82 is engaged by clamping device 128 on the end of the testing cable 118, and responsively to actuation of cable drum 73 which reels in the testing cable 118, the calibrated springs 146, 146' are compressed, and the total anchor load is indicated by the movement between the calibrated dial 158 and the indicator pointer 162. The anchor cable 82 then is disengaged from the stressing cable 118, and the anchor cable is ready for holding the load; and in a series of test runs, the anchors have been driven to a depth of nine feet on four-foot centers at the rate of forty-three per hour, and in further tests, ten-inch anchors placed at six-foot depths in poorly consolidated soils were pulled with an average resistance of approximately 17,000 pounds per anchor.

On the drawings, reference numeral 176 designates vertically disposed tensioning brackets secured to the boom 124, these brackets 176 mounting a tension arm lifting pin 178 beneath which the tensioning cable 118 passes.

While the foregoing description represents a typical and preferred embodiment of the improved construction, it will be apparent that structural details may be varied without detracting from the spirit of the invention; and it will be understood that it is intended and desired to embrace within the scope of the invention such modifications and changes as may be necessary or desirable to adapt it to varying conditions and uses as defined by the appended claim.

Having thus described my invention, what I claim as new and wish to secure by Letters Patent is:

Apparatus for determining resistance of earth anchors embedded in soils against displacement under applied loads, which comprises, in combination, a rig frame, a boom attached to the rig frame, a cable attached to the anchor at substantially right angles thereto and at the center thereof, a source of power for tensioning the cable, a pulley sheave carried by the boom and receiving the cable, compression spring mountings for the sheave applying predetermined force to the sheave in a direction opposite to the force applied to the sheave by the cable, the said sheave being yieldable against the springs when the force applied to the sheave by the cable exceeds the predetermined spring force applied to the sheave, and means adjacent to the sheave for indicating the amount of force on the cable which causes the sheave to move against the force of the springs, thereby measuring force imparted to the anchor by the source of power.

References Cited in the file of this patent
UNITED STATES PATENTS 2,473,517     Freedman _____ June 21, 1949